(12) United States Patent
Hoess et al.

(10) Patent No.: US 11,359,593 B2
(45) Date of Patent: Jun. 14, 2022

(54) IMPULSE START IN A HYBRID DRIVETRAIN

(71) Applicant: Bayerische Motoren Werke Aktiengesellschaft, Munich (DE)

(72) Inventors: Bernhard Hoess, Munich (DE); Thomas Jung, Munich (DE); Sebastian Kobler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/797,935

(22) Filed: Feb. 21, 2020

(65) Prior Publication Data

US 2020/0208600 A1  Jul. 2, 2020

Related U.S. Application Data

(63) Continuation of application No. PCT/EP2018/072799, filed on Aug. 23, 2018.

(30) Foreign Application Priority Data

Aug. 23, 2017 (DE) ...................... 10 2017 214 787.3

(51) Int. Cl.
*F02N 15/02* (2006.01)
*B60W 10/02* (2006.01)
(Continued)

(52) U.S. Cl.
CPC .............. *F02N 15/025* (2013.01); *B60K 6/48* (2013.01); *B60W 10/02* (2013.01);
(Continued)

(58) Field of Classification Search
None
See application file for complete search history.

(56) References Cited

U.S. PATENT DOCUMENTS 3,888,325 A * 6/1975 Reinbeck ................ B60L 50/00
                                                         180/65.25
4,531,605 A * 7/1985 Scholz ................... B60W 10/08
                                                         180/165

(Continued)

FOREIGN PATENT DOCUMENTS

CN          1250511 A       4/2000
CN         108698499 A     10/2018
(Continued)

OTHER PUBLICATIONS

PCT/EP2018/072799, International Search Report dated Dec. 10, 2018 (Three (3) pages).
(Continued)

*Primary Examiner* — Kevin R Steckbauer
(74) *Attorney, Agent, or Firm* — Crowell & Moring LLP (57) ABSTRACT

A hybrid drive device includes an internal combustion engine, an electric machine and an impulse start module which comprises two clutches and a flywheel mass. A method for operating the hybrid device includes opening the first clutch of the impulse-start module and establishing a start-up requirement for the internal-combustion engine. The method also includes closing the first clutch with the second clutch in an open or closed position for a start of the internal-combustion engine.

8 Claims, 5 Drawing Sheets

(51) Int. Cl.
*B60W 30/192* (2012.01)
*F02N 11/06* (2006.01)
*B60K 6/48* (2007.10)
*B60W 20/10* (2016.01)

(52) U.S. Cl.
CPC ............ *B60W 30/192* (2013.01); *F02N 11/06* (2013.01); *B60K 2006/4808* (2013.01); *B60K 2006/4816* (2013.01); *B60K 2006/4825* (2013.01); *B60K 2006/4833* (2013.01); *B60K 2006/4841* (2013.01); *B60W 20/10* (2013.01); *B60W 2510/0241* (2013.01); *F02N 2300/2002* (2013.01)

(56) References Cited

U.S. PATENT DOCUMENTS

| | | | | |
|---|---|---|---|---|
| 6,033,340 | A * | 3/2000 | Amendt | B60W 30/18063 |
| 6,040,634 | A * | 3/2000 | Larguier | B60L 15/20 290/45 |
| 6,098,584 | A * | 8/2000 | Ahner | F02N 5/04 123/179.3 |
| 6,250,270 | B1 * | 6/2001 | Ahner | F02N 5/04 123/179.3 |
| 6,506,139 | B2 * | 1/2003 | Hirt | B60K 6/40 477/3 |
| 7,114,585 | B2 * | 10/2006 | Man | B60K 6/405 180/65.21 |
| 7,686,112 | B2 * | 3/2010 | Shiiba | B60W 10/06 180/65.275 |
| 7,766,107 | B2 * | 8/2010 | Joe | B60W 10/10 180/65.21 |
| 7,770,675 | B2 * | 8/2010 | Hayashi | B60W 10/02 180/65.265 |
| 7,770,678 | B2 * | 8/2010 | Nozaki | B60W 10/115 180/65.6 |
| 7,848,867 | B2 * | 12/2010 | Ueno | B60W 10/11 701/70 |
| 7,885,737 | B2 * | 2/2011 | Hirata | B60W 20/11 701/22 |
| 7,975,791 | B2 * | 7/2011 | Nozaki | B60L 50/16 180/65.6 |
| 8,016,367 | B2 * | 9/2011 | Hirata | B60L 3/0076 303/151 |
| 8,282,527 | B2 * | 10/2012 | Suzuki | B60K 6/48 477/5 |
| 8,328,681 | B2 * | 12/2012 | Kaltenbach | B60W 10/08 477/5 |
| 8,386,107 | B2 * | 2/2013 | Shimanaka | B60W 10/026 701/22 |
| 8,475,331 | B2 * | 7/2013 | Kaltenbach | B60W 10/08 477/5 |
| 8,480,537 | B2 * | 7/2013 | Sano | B60K 6/48 477/5 |
| 8,512,201 | B2 * | 8/2013 | Shimanaka | B60W 10/08 477/5 |
| 8,668,621 | B2 * | 3/2014 | Yoshida | B60W 10/06 477/5 |
| 8,770,164 | B2 * | 7/2014 | Van Druten | B60W 30/18027 123/179.25 |
| 8,812,208 | B2 * | 8/2014 | Suzuki | B60W 10/115 701/67 |
| 8,838,317 | B2 * | 9/2014 | Okuda | F02D 29/00 701/22 |
| 8,868,276 | B2 * | 10/2014 | Tanishima | B60W 20/00 701/22 |
| 8,978,516 | B2 * | 3/2015 | Funk | B60K 6/48 74/665 A |
| 9,102,327 | B2 * | 8/2015 | Tanishima | B60L 50/16 |
| 9,347,500 | B2 * | 5/2016 | Okuda | B60W 10/08 |
| 9,481,358 | B2 * | 11/2016 | Hansson | B60W 20/00 |
| 9,746,051 | B2 * | 8/2017 | Murata | F16H 57/0006 |
| 9,776,497 | B2 * | 10/2017 | Hori | B60L 7/12 |
| 10,053,083 | B2 * | 8/2018 | Miyaishi | B60K 6/48 |
| 10,605,216 | B2 * | 3/2020 | Stalfors | B60W 20/40 |
| 2002/0117860 | A1 | 8/2002 | Man | B60W 10/02 290/46 |
| 2002/0177504 | A1 * | 11/2002 | Pels | B60W 10/06 477/3 |
| 2004/0173393 | A1 * | 9/2004 | Man | B60K 6/365 180/65.21 |
| 2007/0056783 | A1 * | 3/2007 | Joe | B60L 58/12 180/65.265 |
| 2007/0102211 | A1 * | 5/2007 | Nozaki | B60W 10/06 180/65.7 |
| 2007/0114082 | A1 * | 5/2007 | Nozaki | B60L 15/2054 180/65.6 |
| 2007/0173372 | A1 * | 7/2007 | Ueno | B60L 15/2009 477/3 |
| 2007/0199745 | A1 * | 8/2007 | Hayashi | B60K 6/46 180/65.28 |
| 2007/0227791 | A1 * | 10/2007 | Ueno | B60W 10/02 180/65.245 |
| 2007/0228822 | A1 * | 10/2007 | Hirata | B60L 7/18 303/151 |
| 2007/0272456 | A1 * | 11/2007 | Shiiba | B60W 10/08 180/65.275 |
| 2008/0071437 | A1 * | 3/2008 | Hirata | B60W 20/40 701/22 |
| 2010/0075798 | A1 * | 3/2010 | Suzuki | B60W 20/40 477/5 |
| 2010/0248893 | A1 * | 9/2010 | Shimanaka | B60W 10/06 477/5 |
| 2011/0087394 | A1 * | 4/2011 | Shimanaka | B60W 10/06 701/22 |
| 2012/0108385 | A1 * | 5/2012 | Sano | B60W 10/023 477/5 |
| 2012/0199437 | A1 * | 8/2012 | Okuda | F16D 48/04 192/85.63 |
| 2012/0202646 | A1 * | 8/2012 | Suzuki | F16H 61/061 477/5 |
| 2013/0012353 | A1 * | 1/2013 | Yoshida | B60L 15/2045 477/5 |
| 2013/0158766 | A1 * | 6/2013 | Okuda | B60K 6/36 701/22 |
| 2013/0211654 | A1 * | 8/2013 | Tanisshima | B60W 10/02 701/22 |
| 2013/0231813 | A1 * | 9/2013 | Carlhammar | B60K 6/48 701/22 |
| 2013/0231815 | A1 * | 9/2013 | Tanishima | B60W 10/06 701/22 |
| 2013/0247858 | A1 * | 9/2013 | Van Druten | F02N 15/043 123/179.22 |
| 2013/0296099 | A1 * | 11/2013 | Funk | B60K 6/547 477/3 |
| 2013/0296125 | A1 | 11/2013 | Gibson et al. | |
| 2014/0231165 | A1 * | 8/2014 | Hori | B60L 3/106 180/242 |
| 2014/0366682 | A1 * | 12/2014 | Murata | F16F 15/1464 74/572.2 |
| 2015/0099606 | A1 * | 4/2015 | Choi | B60K 6/52 477/5 |
| 2015/0321658 | A1 * | 11/2015 | Hansson | B60W 10/11 701/22 |
| 2015/0329105 | A1 * | 11/2015 | Matsui | F16D 48/062 701/22 |
| 2016/0214600 | A1 * | 7/2016 | Miyaishi | B60W 10/06 |
| 2018/0180011 | A1 * | 6/2018 | Stalfors | B60W 10/11 |
| 2018/0362020 | A1 * | 12/2018 | Kobler | B60K 6/40 |
| 2019/0168743 | A1 * | 6/2019 | Friedrich | F02N 15/02 |
| 2020/0023725 | A1 * | 1/2020 | Hoess | B60W 10/06 |

FOREIGN PATENT DOCUMENTS

| | | | |
|---|---|---|---|
| CN | 109476226 A | | 3/2019 |
| DE | 103 27 306 A1 | | 1/2005 |
| DE | 10 2004 023 673 A1 | | 12/2005 |
| DE | 10 2007 045 367 A1 | | 4/2009 |
| DE | 102009024530 A1 | * | 12/2010 ............... B60K 6/40 |

(56) References Cited

FOREIGN PATENT DOCUMENTS

| DE | 10 2016 202 138 A1 | | 8/2017 | |
|----|----|----|----|----|
| DE | 10 2016 202 828 A1 | | 8/2017 | |
| GB | 2 413 998 A | | 11/2005 | |
| GB | 2413998 A | * | 11/2005 | ............... F02N 5/04 |
| JP | 2012056366 A | * | 3/2012 | ............ B60W 10/02 |
| WO | WO-2009050066 A1 | * | 4/2009 | ............ F16D 23/06 |
| WO | WO 2017/144156 A1 | | 8/2017 | |
| WO | WO 2017/144425 A1 | | 8/2017 | |
| WO | WO 2018/024541 A1 | | 2/2018 | |

OTHER PUBLICATIONS

German Search Report issued in German counterpart application No. 10 2017 214 787.3 dated Feb. 8, 2019, with Statement of Relevancy (Nine (9) pages).
Chinese Office Action issued in Chinese application No. 201880014910.1 dated Nov. 30, 2021, with English translation (Fourteen (14) pages).

* cited by examiner

IMPULSE START IN A HYBRID DRIVETRAIN

CROSS REFERENCE TO RELATED APPLICATIONS

This application is a continuation of PCT International Application No. PCT/EP2018/072799, filed Aug. 23, 2018, which claims priority under 35 U.S.C. § 119 from German Patent Application No. 10 2017 214 787.3, filed Aug. 23, 2017, the entire disclosures of which are herein expressly incorporated by reference.

BACKGROUND AND SUMMARY OF THE INVENTION

The invention relates to a method for operating a hybrid-drive device of a motor vehicle, to a hybrid-drive device and to a motor vehicle.

Hybrid drives for motor vehicles, in which an electric machine is arranged between the internal-combustion engine and the transmission, are known. For instance, there are hybrid drives in which the electric machine is directly coupled to the internal-combustion engine (mild hybrid), or in which a clutch is present between the internal-combustion engine and the electric machine (parallel hybrid drive).

The object of the present invention is to specify an improved method for the operation of a hybrid drivetrain.

The following insights underlie the invention. In a motor vehicle with a mild-hybrid drivetrain, the electric machine is conventionally arranged between the internal-combustion engine and the transmission, in which case the electric machine can be decoupled from the internal-combustion engine via a clutch. Such a hybrid drive, however, is not designed for an impulse start of the internal-combustion engine.

For such a hybrid drive of a motor vehicle, the electrical starting procedure is possible as a bridged starting: the electric machine accelerates the motor vehicle, beginning at a speed of zero of the electric machine, all the clutches in the transmission that are necessary for the flow of force being closed. Another possibility is the starting with the aid of a starting element within the transmission: the electric machine rotates at a certain speed at the transmission input, a starting element within the transmission (for instance, a clutch) is in a state of slippage. At the end of the starting procedure this clutch has then been completely closed.

Figure 1:
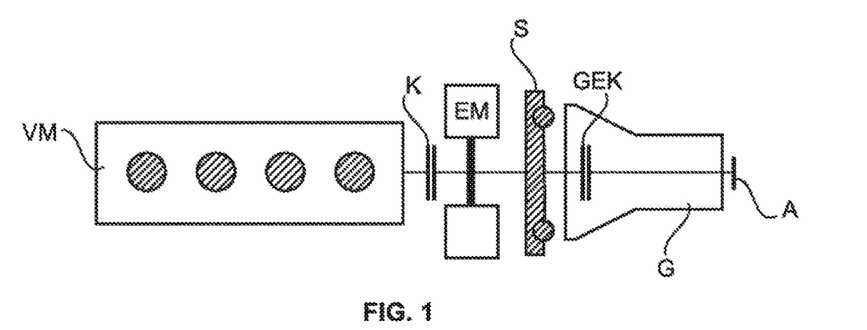
FIG. 1 depicts a drivetrain.

In the case of a drivetrain as shown in FIG. 1, the start of the internal-combustion engine VM is undertaken with the aid of the mass moment of inertia of the rotating electric machine EM and of a flywheel S. In the case of a requirement for a start of the internal-combustion engine VM—if, for instance, a power limit of the electric machine EM has been attained or the available capacity of the battery (SOC) is low—at first a raising of the speed of the electric machine EM is undertaken, in the course of which the transmission input clutch GEK of the transmission G is in a state of slippage and transmits the torque required for the propulsion to the output A. If the speed at the electric machine EM is then sufficiently high, the clutch K to the internal-combustion engine VM is closed. The synchronous speed for the internal-combustion engine VM in this case lies above the speed of the transmission input clutch GEK. Subsequently the slippage in the transmission input clutch GEK is reduced.

In accordance with the invention, the object is achieved by a method for operating a hybrid-drive device of a motor vehicle, wherein the hybrid-drive device comprises an internal-combustion engine, an electric machine and an impulse-start module. The impulse-start module comprises two clutches and a centrifugal mass. The method comprises the following steps: opening the first clutch of the impulse-start module, establishing a start-up requirement for the internal-combustion engine, closing the first clutch, with the second clutch open or closed, for the start of the internal-combustion engine. The start-up requirement can occur with the aid of a control unit of the hybrid-drive device or of the vehicle. The centrifugal mass includes a rotation-inequality-reducing element or a flywheel.

In the case of the method according to the invention, the focus is on the sequences of operations in the course of the transition from electric driving to hybrid driving, and vice versa.

In a further development, the invention provides that the start of the internal-combustion engine is undertaken with the aid of a reciprocal actuation of the first and second clutches of the impulse-start module. For this purpose, in some embodiments the second clutch is opened while the first clutch is closed at the same time. In other words, the closing and opening of the first and second clutches proceed in parallel or simultaneously.

In a further development, the invention provides that the start of the internal-combustion engine is executed as an initial start. "Initial start" encompasses the start of the internal-combustion engine when the vehicle is stationary. An initial start of the internal-combustion engine may occur after a start-up requirement, after which a battery of the vehicle has to make electrical energy available for electrical loads—for instance, air-conditioning system, seat heating, etc.—and the state of charge of the battery would fall below a minimum limit.

In a further development, the invention provides that the impulse-start module starts the internal-combustion engine in the course of electric starting, and the centrifugal mass of the impulse-start module is coupled with the electric machine by means of the closed second clutch. In some embodiments, this centrifugal mass includes the rotation-inequality-reducing element of the internal-combustion engine. The rotation-inequality-reducing element is, in particular, connected to the electric machine in the course of electric driving, the second clutch being closed.

In a further development, the invention provides that the impulse-start module starts the internal-combustion engine in the course of engine-off coasting.

In a further development, the invention provides that the impulse-start module starts the internal-combustion engine during electric driving.

In a further development, the invention provides that a speed of the centrifugal mass has been chosen in such a way that in the course of the start-up of the internal-combustion engine the speed thereof lies above an idling speed after activating of the centrifugal mass.

In a further development, the invention provides that after opening of the second clutch the electric machine is shifted at least one gear higher prior to the engaging of the internal-combustion engine.

In other words, a shifting strategy for the electric machine, particularly in electric driving, is selected in such a way that the speed of the centrifugal mass is such that in the course of start-up immediately after activating of the centrifugal mass the internal-combustion engine has a speed above the idling speed of the internal-combustion engine. In some embodiments, the speed lies distinctly above the idling speed of the internal-combustion engine. In some embodiments, after activating of the centrifugal mass the speed of the internal-combustion engine is close to a target speed for the subsequent hybrid operation. In this case, after the opening of the clutch the electric machine is shifted at least one gear higher before the internal-combustion engine is brought into the flow of force.

In a further development, the invention provides that prior to the start-up of the internal-combustion engine a speed of the electric machine has been chosen in such a way that after activating of the flywheel the speed of the internal-combustion engine lies between a natural-frequency speed of the internal-combustion engine and the idling speed, in which case in at least one segment of the activating of the centrifugal mass the second clutch is closed again or kept closed. The electric machine assists the run-up of the internal-combustion engine by virtue of the inertia thereof and/or in terms of torque.

Furthermore, a hybrid-drive device, according to the invention, of a motor vehicle is specified. The hybrid-drive device comprises an internal-combustion engine, an electric machine and an impulse-start module which is arranged between the internal-combustion engine and the electric machine and comprises a first clutch and a second clutch. For the start of the internal-combustion engine, the first clutch has been closed when the second clutch of the impulse-start module is open or closed.

In a further development, the invention provides that the impulse-start module includes a rotation-inequality-reducing element.

Furthermore, a motor vehicle according to the invention—in particular, a passenger car—is specified for applying the method, said motor vehicle exhibiting a hybrid-drive device which comprises an internal-combustion engine and an electric machine.

Other further developments of the invention arise out of the dependent claims.

Special embodiments of the invention will now be described with reference to the appended drawings. This invention may, however, be implemented in many different forms and should not be construed as being limited to the embodiments set forth herein; rather, these embodiments have been provided in order that this disclosure is thorough and complete, and they cover the scope of protection of the invention completely for a person skilled in the art. The terminology that is used in the detailed description of the embodiments represented in the appended drawings is not intended to be restrictive for the invention. In the drawings, like symbols refer to like elements.

Further particulars of the invention can be gathered from the exemplary embodiments which will be described in the following on the basis of the figures. Shown are:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
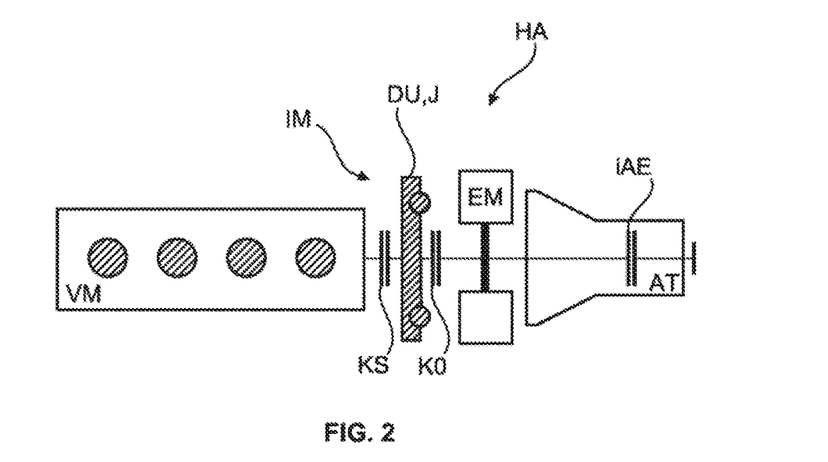
FIG. 2 depicts a hybrid drivetrain.

In FIG. 2 a hybrid drivetrain is shown schematically. The hybrid-drive device HA comprises an internal-combustion engine VM, an electric machine EM and an impulse-start module IM which is arranged between the internal-combustion engine VM and the electric machine EM and comprises a first clutch KS and a second clutch K0. A rotation-inequality-reducing element DU is arranged between the clutches KS and K0. Instead of the rotation-inequality-reducing element DU, in some embodiments a flywheel is used. The start of the internal-combustion engine VM is undertaken with the aid of a reciprocal actuation of the first KS and second K0 clutch of the impulse-start module IM.

The figures described in the following each relate to an operating strategy for the method for operating a hybrid-drive device HA of a vehicle with P2-mild-hybrid drivetrain, as shown in FIG. 2. The first clutch KS separates the rotation-inequality-reducing element DU (dual-mass flywheel, torsion-vibration damper, speed-adaptive absorber, . . . ), also called DU element in the following, from the internal-combustion engine VM.

The lower axis in each figure specifies the change of the clutch or the rotational speeds over time. The transitions from one state to the other or from one speed to another are within the milliseconds (ms) range. The states in which the vehicle has been represented as electric or as a hybrid (that is to say, with engaging of the internal-combustion engine) encompass a range of seconds. The speed specified by LL corresponds to an idling speed of the internal-combustion engine and is between 600-900 revolution per minute.

Figure 3:
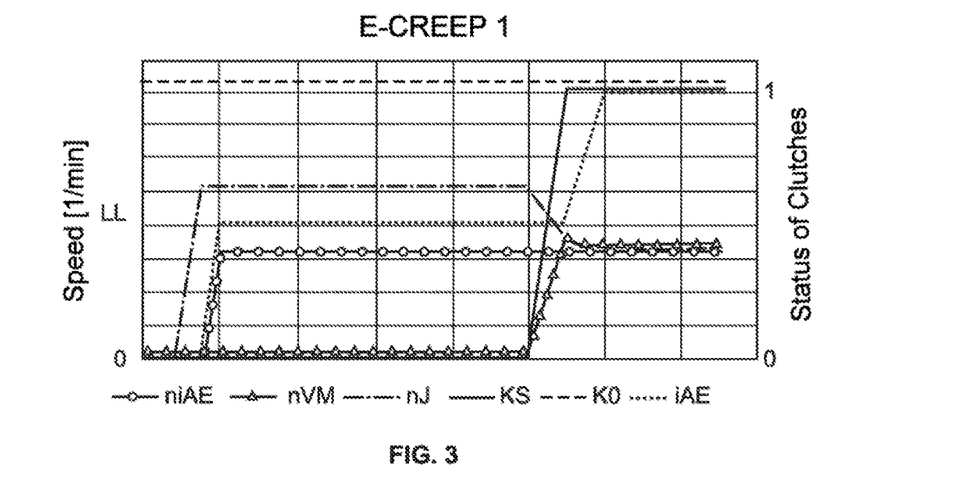
FIG. 3 depicts a first variant of an electric starting on the basis of speed and clutch status.

FIG. 3 shows a first variant of an electric starting on the basis of speed and clutch status, also called electric creep. In this first variant, the vehicle is at the beginning, the speeds of VM and EM are zero. During or shortly before the starting, the electric machine EM is brought to a certain speed. The second clutch K0 in this case has been closed, so that the DU element is also accelerated concomitantly. By virtue of the torque of the electric machine EM, the vehicle is accelerated. The starting element here is located in the transmission iAE. If creeping is effected without accelerator pedal and at constant vehicle speed, the electric machine EM rotates at elevated rate, so that an impulse start of the internal-combustion engine is possible at any time. The iAE is in a state of slippage.

In this variant of the start-up, in the case of a start requirement at first the first clutch KS is closed. The internal-combustion engine VM is started and accelerated to an ensuing synchronous speed which lies above the speed at the iAE. Consequently no change of arrangement takes place at the iAE, which would be clearly noticeable at the output. Subsequently the slippage in the iAE is reduced and the internal-combustion engine VM takes over the propulsion.

This start-up can be put into operation so long as the speed at the internal-combustion engine VM arising upon closing of the first clutch KS lies above the speed at the transmission iAE. The speed at the transmission iAE is considered to be directly proportional to the vehicle speed (in a fixed gear).

Figure 4:
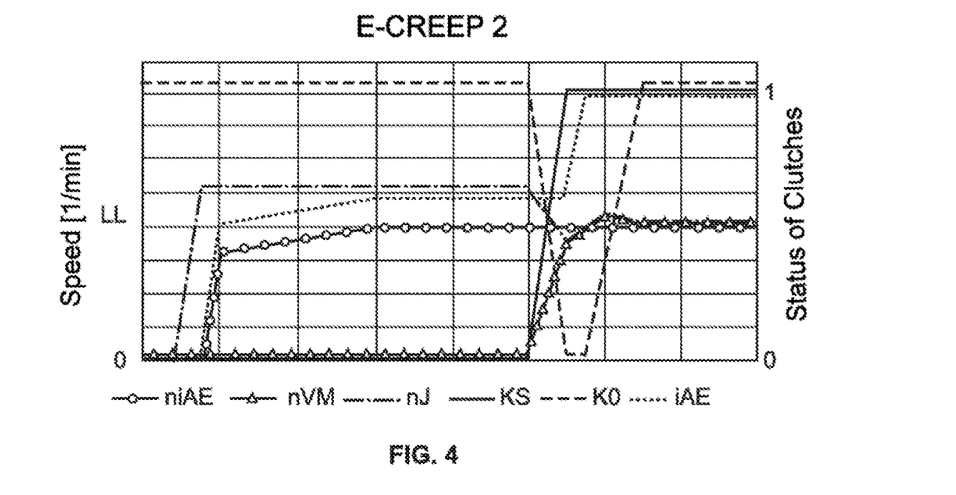
FIG. 4 depicts a second variant of an electric starting on the basis of speed and clutch status.

FIG. 4 depicts a second variant of an electric starting on the basis of speed and clutch status. In the case where the limiting speed for the first start variant, in FIG. 3, is exceeded in creep, the start-up is undertaken in a manner analogous to FIG. 4. At start-up here, at first the centrifugal mass of the DU element is decoupled by opening of the second clutch K0. The electric machine EM can provide the full available power for propelling the vehicle. Subsequently the internal-combustion engine VM is started by closing of the first clutch KS. The still missing speed-range up to the coupling speed the internal-combustion engine VM executes by combustion of fuel. When the transmission input speed is attained, a speed control begins to regulate the internal-combustion engine VM to the target speed, and the second clutch K0 can be closed. Subsequently the internal-combustion engine VM takes over the propulsion, and the electric machine EM reduces its torque.

Figure 5:
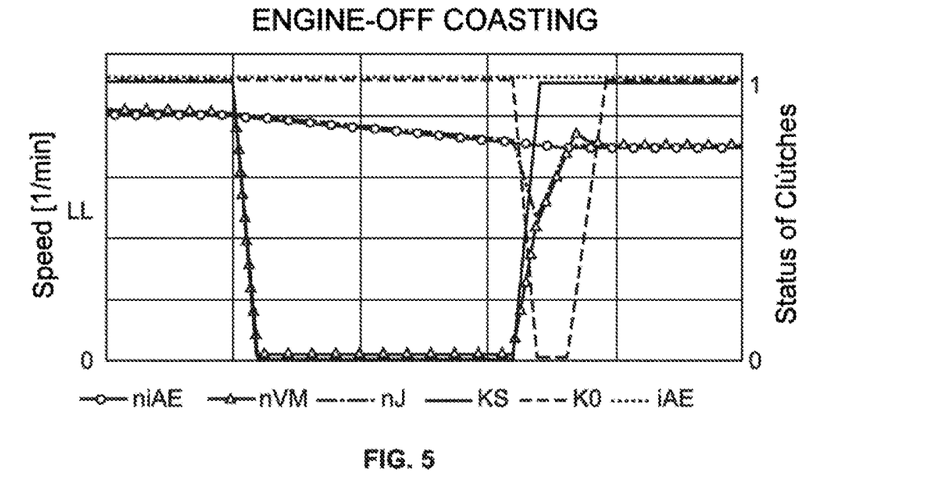
FIG. 5 depicts an engine-off coasting on the basis of speed and clutch status.

FIG. 5 shows an engine-off coasting on the basis of speed and clutch status. "Engine-off coasting" means that the internal-combustion engine VM has been separated from the drivetrain, and the first clutch KS is open. No accelerator pedal is being actuated by the driver, and the electric machine EM consequently is not providing a positive torque. The vehicle can consequently roll more or less freely. All the clutches within the transmission are closed; the gears are adjusted in accordance with the vehicle speed. The second clutch K0 is closed. The centrifugal mass of the DU element DU consequently always has the same speed as the transmission input.

The free rolling is represented by the decrease of the speed of nJ. In the case of a start requirement, the second clutch K0 is opened quickly. The centrifugal mass can rotate freely. By virtue of the closing of the first clutch KS, the internal-combustion engine VM is started and dragged to a synchronous speed. Subsequently the internal-combustion engine VM builds up speed by combustion of fuel. When the transmission input speed is attained, a speed control begins to regulate the internal-combustion engine VM to the target speed, and the second clutch K0 can be closed. Subsequently the internal-combustion engine VM takes over the propulsion, and the electric machine EM reduces its torque.

The start-up from the engine-off recuperation proceeds in identical manner, with the difference that in the recuperation the vehicle speed decreases more intensely by reason of the negative torque on the electric machine EM.

Figure 6:
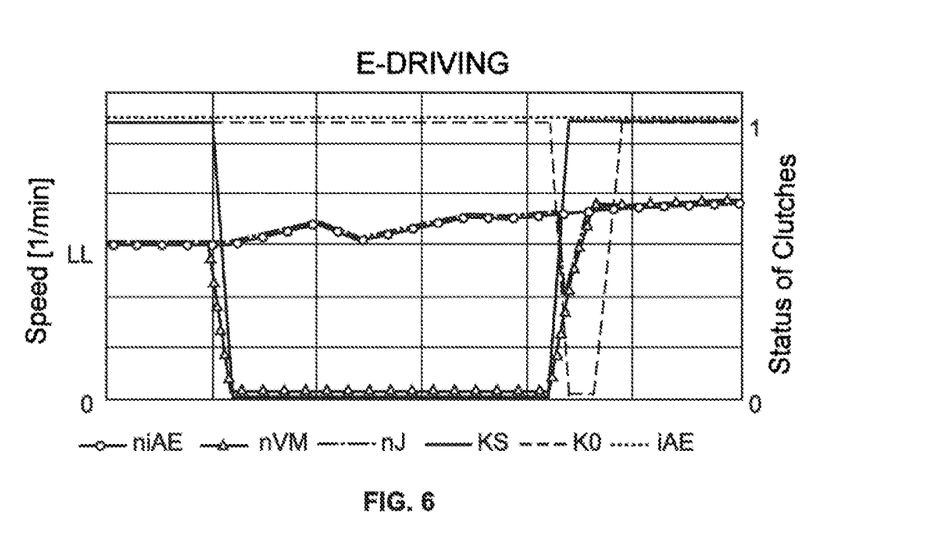
FIG. 6 depicts a start-up of the internal-combustion engine from electric driving on the basis of speed and clutch status.

FIG. 6 shows a start-up of the internal-combustion engine from electric driving on the basis of speed and clutch status. The start-up from electric driving proceeds like the start-up from the engine-off coasting (cf. FIG. 5). During the start-up, the electric machine EM can make the full power available for the propulsion of the vehicle. A first vehicle reaction can consequently be represented.

During electric driving, the second clutch K0 has been closed; the centrifugal mass DU consequently rotates at transmission input speed. By virtue of an adapted transmission-shift strategy, this speed can always be kept within a speed-band suitable for the impulse start.

Figure 7A:
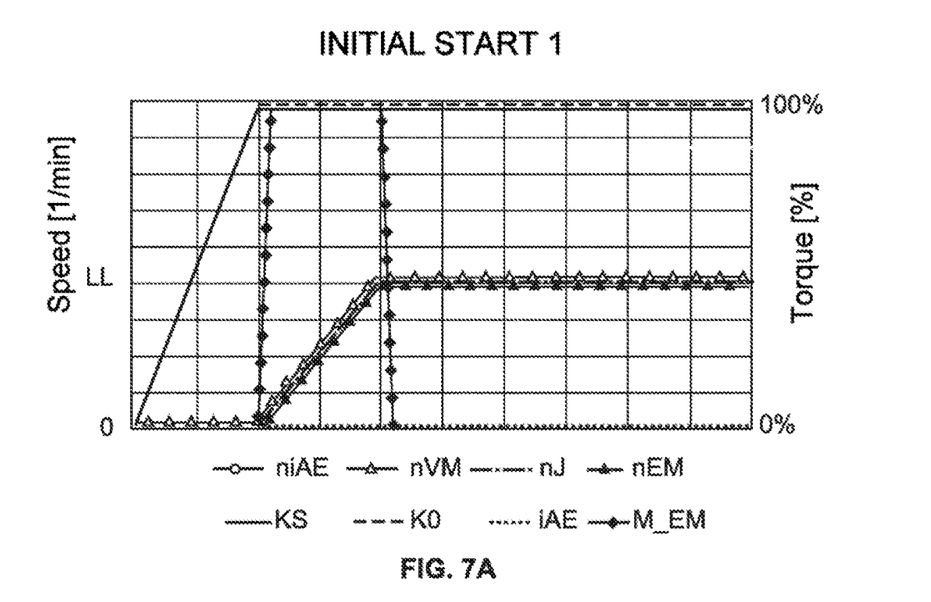
FIG. 7A depicts a first variant of an initial start of the internal-combustion engine in the case of a stationary vehicle on the basis of speed and torque.
Figure 7B:
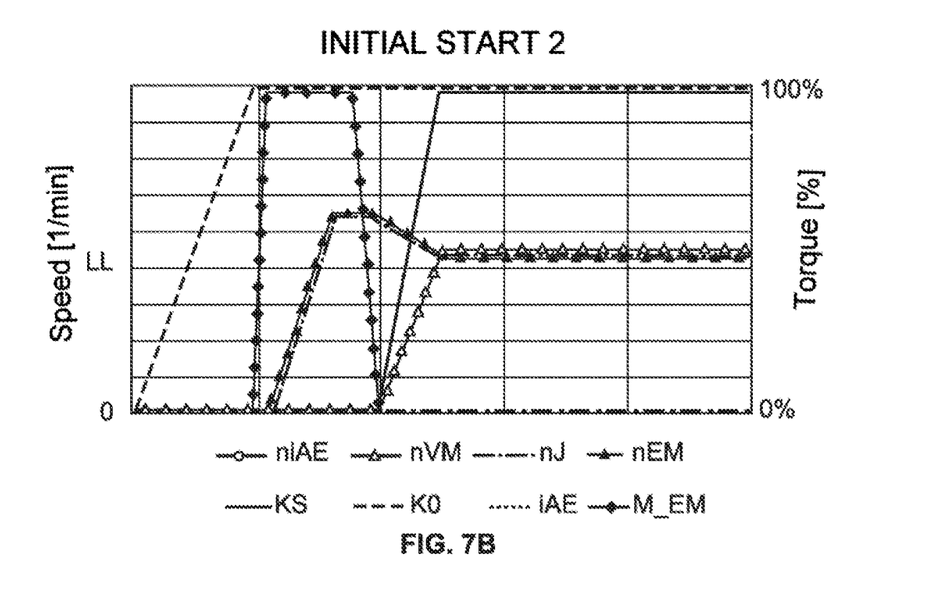
FIG. 7B depicts a second variant of an initial start of the internal-combustion engine on the basis of speed and torque.
Figure 7C:
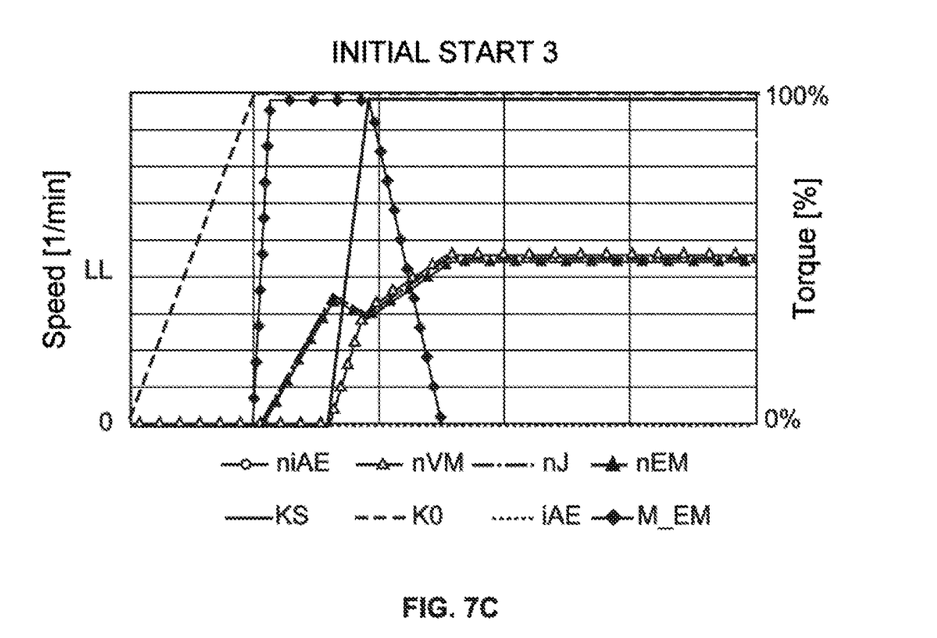
FIG. 7C depicts a third variant of an initial start of the internal-combustion engine on the basis of speed and torque.

By reason of some boundary conditions (low outside temperature, low state of charge of the battery, etc.), it may happen that a start of the internal-combustion engine is initiated at the beginning of the journey at standstill. Since an additional start device is dispensed with, here too an impulse start of the internal-combustion engine is undertaken. For this purpose, three start variants are conceivable, which are shown in FIGS. 7A-7C. The designations of the curves are:

niAE: speed of the starting clutch iAE within the transmission,
nVM: speed of the internal-combustion engine VM,
nJ: speed of the centrifugal mass J,
nEM: speed of the electric machine EM,
MEM: torque of the electric machine EM and
KS, K0 and iAE: status of the corresponding clutch.

FIG. 7A shows a first variant of a cold start of the internal-combustion engine on the basis of speed and torque. At the beginning, the first clutch KS and the second clutch K0 are closed. The internal-combustion engine VM is started with the aid of the torque of the electric machine.

FIG. 7B shows a second variant of a cold start of the internal-combustion engine on the basis of speed and torque. The centrifugal mass DU is brought to a certain starting speed by the torque of the electric machine. Subsequently the internal-combustion engine VM is started by closing of the first clutch KS. Here, the inertia of the DU element and of the electric machine acts on the crankshaft in order to start the internal-combustion engine VM.

FIG. 7C shows a third variant of a cold start of the internal-combustion engine on the basis of speed and torque, and may be regarded as a combination of the first and second variants (FIGS. 7A, 7B): the electric machine and the centrifugal mass DU are racing at the beginning. As soon as a certain speed has been attained, the first clutch KS is closed. Under the action of torque of the electric machine EM and the inertia of the centrifugal mass and the electric machine EM, the internal-combustion engine VM is started.

It should be borne in mind that the methods, devices and systems described in this document can be used both on their own and in combination with other methods, devices and systems described in this document. Furthermore, any aspects of the methods, device and systems described in this document can be combined with one another in diverse ways. In particular, the features of the claims can be combined with one another in diverse ways.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hybrid-drive device of a motor vehicle, wherein the hybrid-drive device comprises: an internal-combustion engine, an electric machine, and an impulse-start module, wherein the impulse-start module comprises a first clutch, a second clutch, and a centrifugal mass coupled to the internal-combustion engine solely via the first clutch and to the electric machine solely via the second clutch, the method comprising:
  opening the first clutch;
  establishing a start-up requirement for the internal-combustion engine;
  closing the first clutch, so as to couple the centrifugal mass to the internal-combustion engine, while opening the second clutch to an open position and thereby decoupling the centrifugal mass from the electric machine, when the start-up requirement is a first start-up requirement, and while maintaining the second clutch in a closed position, coupling the centrifugal mass to the electric machine, when the start-up requirement is a second start-up requirement, so as to start the internal-combustion engine in accordance with the start-up requirement;

selecting a speed of the centrifugal mass such that, during the start of the internal-combustion engine, the speed of the centrifugal mass lies above an idling speed of the internal-combustion engine prior to closing the first clutch; and shifting the electric machine at least one gear higher after opening the second clutch and prior to closing the first clutch.

2. The method according to claim 1, wherein the start of the internal-combustion engine is performed with the aid of a reciprocal actuation of the first clutch and the second clutch of the impulse-start module.

3. The method according to claim 1, wherein the start of the internal-combustion engine is executed as an initial start.

4. The method according to claim 2, wherein the start of the internal-combustion engine is executed as an initial start.

5. The method according to claim 1, wherein the impulse-start module starts the internal-combustion engine during electric starting, whereby the centrifugal mass of the impulse-start module is coupled with the electric machine by the second clutch in the closed position.

6. The method according to claim 2, wherein the impulse-start module starts the internal-combustion engine during electric starting, whereby the centrifugal mass of the impulse-start module is coupled with the electric machine by the second clutch in the closed position.

7. The method according to claim 1, wherein the impulse-start module starts the internal-combustion engine during engine-off coasting or during electric driving.

8. The method according to claim 2, wherein the impulse-start module starts the internal-combustion engine during engine-off coasting or during electric driving.

* * * * *